United States Patent [19]

Carlson et al.

[11] Patent Number: 5,100,950

[45] Date of Patent: Mar. 31, 1992

[54] RUBBER AND FLUOROCARBON MICROPOWDER COMPOSITION

[75] Inventors: Douglas W. Carlson, Kingwood; William D. Breach, Humble, both of Tex.

[73] Assignee: Hydril Company, Houston, Tex.

[21] Appl. No.: 262,251

[22] Filed: Oct. 20, 1988

Related U.S. Application Data

[63] Continuation of Ser. No. 91,263, Aug. 31, 1987, abandoned, which is a continuation-in-part of Ser. No. 904,057, Sep. 5, 1986, abandoned.

[51] Int. Cl.⁵ .............................................. C08K 5/01
[52] U.S. Cl. ..................................... 524/490; 524/495; 524/520; 525/199; 523/149
[58] Field of Search ............... 524/520, 495, 496, 490; 525/199; 523/149

[56] References Cited

U.S. PATENT DOCUMENTS

| | | | |
|---|---|---|---|
| 3,345,942 | 10/1967 | Meltz | 524/520 |
| 3,769,370 | 10/1973 | Martin et al. | 524/520 |
| 3,994,895 | 11/1976 | Wasserman et al. | 524/520 |
| 4,328,133 | 5/1982 | Ogawa et al. | 524/520 |
| 4,596,839 | 6/1986 | Peters | 524/520 |
| 4,853,428 | 8/1989 | Theodore et al. | 524/490 |

FOREIGN PATENT DOCUMENTS

| | | | |
|---|---|---|---|
| 151739 | 4/1980 | Japan | 524/520 |
| 151740 | 4/1980 | Japan | 524/520 |
| 76545 | 9/1983 | Japan | 524/520 |
| 010165 | 1/1987 | Japan | 524/495 |

OTHER PUBLICATIONS

DuPont, DLX-6000 Eperimental Fluorocarbon Micropowder (No Date), 1 page printed front and back.

Primary Examiner—Paul R. Michl
Assistant Examiner—Christopher P. Rogers
Attorney, Agent, or Firm—Vaden, Eickenroht, Thompson & Boulware

[57] ABSTRACT

A rubber composition with small fluorocarbon micropowder particles incorporated into the composition which reduces the coefficient of friction. The rubber with a lowered coefficient of friction allows for ease of movement of the rubber part against metal surfaces thereby reducing the wear of the rubber part.

12 Claims, 1 Drawing Sheet

RUBBER AND FLUOROCARBON MICROPOWDER COMPOSITION

This application is a continuation of application Ser. No. 091,263, filed Aug. 31, 1987, now abandoned, which in turn is a continuation-in-part of application Ser. No. 904,057, filed Sept. 5, 1986, now abandoned.

BACKGROUND AND SUMMARY OF THE INVENTION

This invention is for a rubber composition which is wear resistant and has a lowered coefficient of friction. The natural or synthetic rubber has fluorocarbon micropowder particles incorporated into the composition. A rubber with a lower coefficient of friction is a great advantage when used in applications subjecting the rubber part to wear against a metallic or hard surface. The lower coefficient of friction allows for ease in movement of the rubber part against the metal surfaces. The composition is useful as a seal between two metal surfaces that move in different directions relative to each other.

The present composition has particular application in packing elements and seals for drilling equipment and especially for large offshore oil and gas drilling equipment. Rubber packers are used in equipment associated with the equipment for delivery of oil and gas from the ocean floor to the platform floating on the ocean's surface. The rubber packers are placed between the inner barrel and outer barrel on the marine riser just below the floating platform. The platform moves with the ocean wave movement. The pipe string extends from the platform to the ocean floor and below to the producing formation. The almost constant diverse movement on the marine riser packers will reduce the usable life of a packer to six months or less depending on drilling and sea conditions.

The rubber composition of this invention exhibits unusual resistance to wear. The rubber parts which encounter constant movement against their surfaces benefit from a reduced friction contact with the metallic surface which causes the rubber to abrade on the metallic surface. The rubber parts lose their shape and must be replaced. The improved rubber composition increases the life of the part and eliminates the down time associated with replacement. With the new rubber composition there is less abrasion because the rubber and metal tend to slide against each other. When there is some deposition of the rubber on the metal part during the movement of the riser, there will be less friction between the rubber packer and the rubber coated surface of the metal part due to the improved low friction rubber composition used in the packer.

The new composition contains a high loading of fluorocarbon micropowder of particles which have a typical diameter of less than one micron. Even with the high loading the composition can be mixed and processed with conventional equipment. The physical properties of the rubber for manufacturing purposes are not affected. The inert fluorocarbon micropowder can be used in the natural and synthetic rubbers. Another embodiment of the new composition includes using an oil which is incompatible with the rubber base stock with the fluorocarbon micropowder to comprise a friction reducing system. Also, a system can be used of a mixture of fluorocarbon particles, incompatible oil and graphite.

The rubber parts made of this invention will have a longer useful lifetime. This attribute will save expenditures in replacement parts, down-time experienced during replacement and provide a more reliable rubber part for applications in which avoiding wear on the part subjected to constant movement or motion against a metal part is desired.

DESCRIPTION OF THE PREFERRED EMBODIMENT

Figure 1:
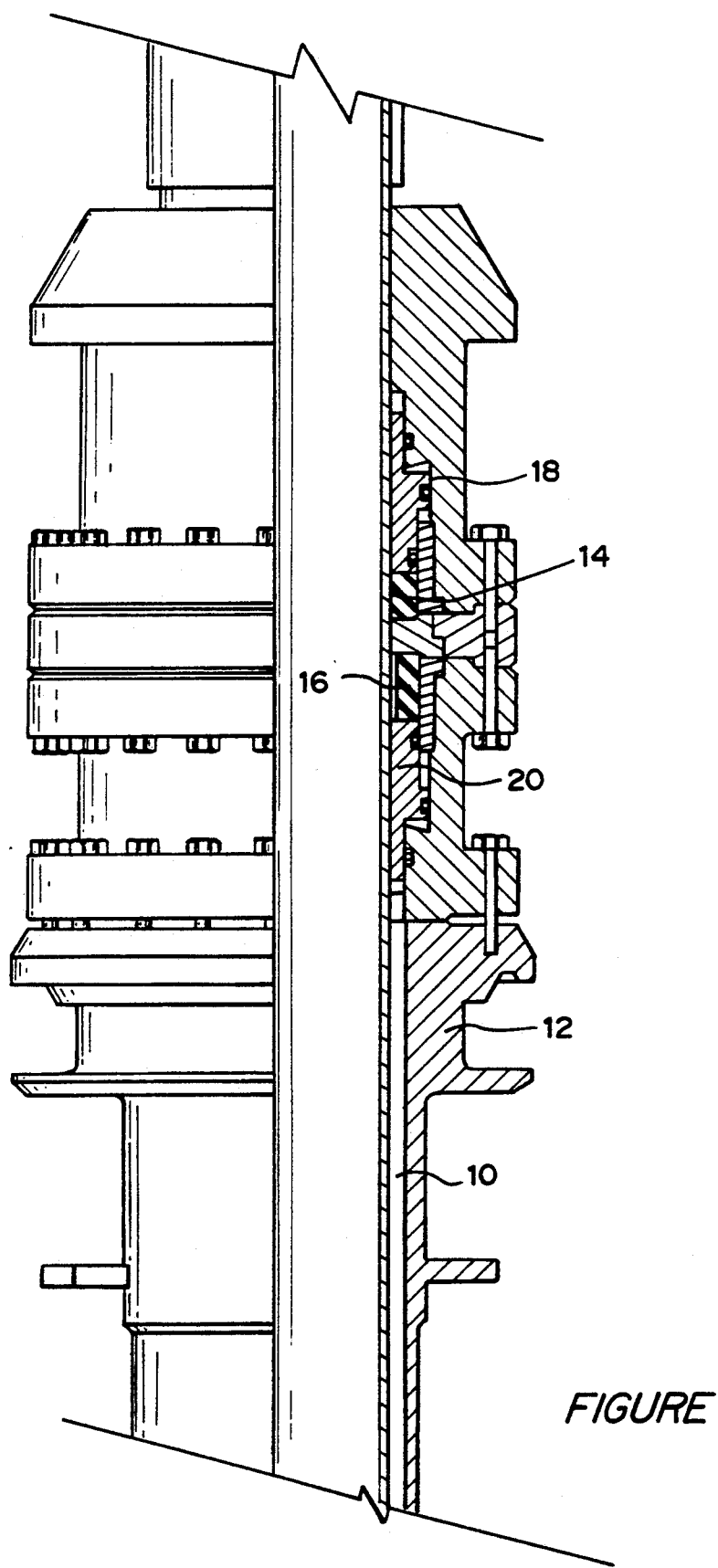
FIG. 1 is a cross-section of a telescopic marine riser joint.

The new wear resistant rubber composition can be made with natural rubber, Standard Malaysian Rubber (SMR) or nitrile rubber. The fluorocarbon microparticles are less than one micron and can be used with either type of rubber.

In addition to using the fluorocarbon microparticles as an ingredient to reduce coefficient of friction and improve wear characteristics it has been found that an incompatible oil may be added to enhance these characteristics. An incompatible oil is one that is not miscible with base rubber stock. Certain oils typically are selected with which rubbers with which they are miscible or compatible to perform as softeners and plasticizers. In this invention a non-miscible or incompatible oil is used in combination with the fluorocarbon micropowder to produce a wear resistant compound.

Other friction reducing compounds such as fine powder graphite can be included. A system can be prepared using a mixture of fluorocarbon micropowder, incompatible oil and powdered graphite. The wear resistance additives are 35% by weight of base polymer or less. When the fluorocarbon micropowder and incompatible oil are used their ratio is from 5% to 35% and 1% to 3% respectively of the mixture added to the rubber. When the wear reducing system is composed of fluorocarbon micropowder, incompatible oil, and powdered graphite the ratio are 5% to 35% and 1% to 3% and 1% to 3% respectively in relative weight to the rubber base used.

The following are examples of natural and nitrile rubber compositions which have been made with fluorocarbon micropowder and other wear reducing ingredients described above. The preferred fluorocarbon micropowder is DLX-6000 manufactured by E. I. DuPont de Nemours & Company. The DLX-6000 is poly tetrafluoroethylene micropowder. The particles are typically less than one micron and loosely agglomerate to about 150 microns; upon mixing and blending the particles deagglomerate. The powder is inert in most environments including corrosives. The operating temperature range of the fluorocarbon micropowder is from $-190°$ C. ($-320°$ F.) to about $250°$ C. ($480°$ F.). Selected characteristics of DLX-6000 fluorocarbon micropowder are shown in Table I.

TABLE I

| Properties | DLX-6000 |
| --- | --- |
| Typical size on blending | <1 micron |
| Melting range | 320°-340° C. |
| Inherent density | 2.3 |
| Solubility | Insoluble |
| Chemical resistance | Inert to almost all chemical and solvents |
| Water absorption | Nil |

The following are examples of the rubber composition using natural and nitrile rubbers and the ingredients to provide the wear resistance. The rubbers are sulfur cured for the desired cross-linkage characteristics. The sulfur cure system can be varied to alter the degree of cross-linkage.

EXAMPLE 1

The rubber used in Example 1 is Standard Malaysian Rubber (SMR). A masterbatch of SMR was made for loading the DLX-6000 micropowder. A conventional Banbury mixer was set at 25 rpm and the ram was set at 50 psi. The natural rubber used was SMR-CV 60. 100 parts of SMR-CV 60 was mixed with 5 parts per weight of zinc oxide and mixed for about three minutes. Materials to be added were measured by parts per weight of SMR-CV 60.

After mixing the SMR-CV 60 and zinc oxide, 15 parts of N660 carbon black and 22.5 parts of N774 carbon black are added along with 1 part of antioxidant. A preferred antioxidant is BLE-25, the high temperature reaction product of diphenylamine and acetone, manufactured by Uniroyal Chemical. After about one and one-half minutes of mixing an additional 15 parts of N660 carbon black and 22.5 parts of N774 carbon black were added and mixed for another one and one-half minutes. After mixing of the carbon black a total of six minutes of mixing time has elapsed.

The following additions are made to the mixture: 2 parts stearic acid, 1 part Sunolite 666, an antiozonant which is a blend of petroleum waxes manufactured by Witco Chemical, 7.5 parts of napthenic oil which in this example is Circosol ASTMD 2226 Type 103, and a plasticizer, which in this embodiment is 20 parts dioctyl phthalate. The masterbatch is mixed for one minute longer with the temperature rising to about 205°–210° F. This procedure ends the mixing of the masterbatch. Other compatible inhibitors, processing oils, plasticizers and antioxidants can be used.

Part A masterbatch is made by warming 54.3 lbs. of the masterbatch and mixing 17.7 lbs. of DLX-6000 fluorocarbon powder.

Part B masterbatch is made by warming 70.0 lbs. of the masterbatch and mixing the sulfur cure system, in this instance composed of 410 grams of sulfur, 410 grams benzothiazyl disulfide accelerator marketed as Altax (rodform) by R. T. Vanderbilt, 30 grams tetramethyl thiuram accelerator marketed as Unads (rodform) by R. T. Vanderbilt and a retarder S(PVI)D50 which is N(cyclohexylthio)-phthalimide in an SBR binder, a Wyrough & Loser product.

Part A and Part B masterbatch are mixed in equal parts to give a natural rubber composition of Example 1 with about 12.3% DLX-6000 content. Example 1 was cured for 50 minutes at 300° F. The properties for Example 1 are shown in Table II.

TABLE II

| Physical Properties of Example 1. | |
|---|---|
| Rheometer ASTM D2084-79 320° F. 6 min. motor, 3° arc. | 100 cpm |
| ML, Minimum torque (pounds force/inch) | 9.0 |
| MH, Maximum torque (pounds force/inch) | 44.0 |
| TS2 minutes to a 2 pound force/inch rise above ML | 2.325 |
| TC (90), minutes to 90% of maximum torque | 4.1 |
| Tensile strength ASTM D412-75 psi | 2165 |
| $M_{100}$ psi | 265 |
| $M_{300}$ psi | 1150 |
| Elongation, ASTM D412-75, Percent | 500 |

TABLE II-continued

| Physical Properties of Example 1. | |
|---|---|
| Durometer, Shore A, ASTM D2240-75 | 60 |
| Tear strength, Die C, ASTM D624-73 pounds/inch | 190 |

EXAMPLE 2

Another formulation of the new composition was made by taking 750 parts of the combined Part A and Part B masterbatch with 12.3% DLX-6000 content from Example 1 and adding an additional 245 parts by weight of DLX-6000 to give a rubber composition with 34% by weight of DLX-6000.

Vulcanized samples of the fluorocarbon micropowder and natural rubber were prepared for coefficient of friction testing. The samples were run on an Instron Test machine following ASTM D1894. A sled measuring $2\frac{1}{2}"\times 2\frac{3}{8}"$ weighing 198.8 grams and a stainless steel plate for the plane were used. The following results in Table III were recorded.

TABLE III

| Friction Test Results - Example 1 and 2 | |
|---|---|
| Sample | lbs: force |
| SMR Natural Rubber (No DLX-6000) | 0.367* |
| Example 1 12.3% DLX-6000 | 0.223* |
| Example 2 34% DLX-6000 | 0.198* |

*average of 3 tests

Table III shows the decrease in friction relative to the increase in DLX-6000 loading.

EXAMPLE 3

This example is a natural rubber with fluorocarbon micropowder and an incompatible oil. The composition is made by mixing 35 lbs. each of Part A masterbatch and Part B masterbatch of Example 1 and blending 1.1 lbs. of oleyl nitrile liquid, a plasticizer OLN manufactured by Harwick, Sp. Gr. 0.85. Example 3 was cured for 5 minutes at 300° F. Typical physical properties of Example 3 are shown in Table IV.

TABLE IV

| Physical Properties of Example 3. | |
|---|---|
| Rheometer ASTM D2084-79 320° F. 6 min. motor, 3° arc. | 100 cpm |
| ML, Minimum torque (pounds force/inch) | 8.75 |
| MH, Maximum torque (pounds force/inch) | 38.0 |
| TS2 minutes to a 2 pound force/inch rise above ML | 2.7 |
| TC (90), minutes to 90% of maximum torque | 4.1 |
| Tensile strength ASTM D412-75 psi | 2115 |
| $M_{100}$ psi | 240 |
| $M_{200}$ psi | 525 |
| $M_{300}$ psi | 945 |
| Elongation, ASTM D412-75, Percent | 545 |
| Durometer, Shore A, ASTM D2240-75 | 55 |
| Tear strength, Die C, ASTM D624-73 pounds/inch | 140 |

EXAMPLE 4

This example is a nitrile rubber mixed with a highly paraffinic long chain oil that is incompatible with nitrile rubber. The rubber composition is made mixing the friction and wear reducing system using DLX-6000; graphite, in this embodiment a 98% graphitic carbon 325 mesh; and an incompatible oil, in this embodiment 72% paraffinic oil (ASTM D2226 Type 104B) 28%

Microcel E sunpar 2280 dlc manufactured by Harwick. A nitrile rubber plasticizer oleyl nitrile liquid Sp.Gr. 0.85 OLN manufactured by Harwick is also used. The following amounts shown in Table V make up Part A of the composition.

TABLE V

| Part A Starting Materials - Example 4 | Weight |
|---|---|
| Nitrile Rubber Masterbatch | 50 lbs. |
| DLX-6000 | 17.60 |
| Graphite | 2.20 |
| Paraffinic Oil | 2.2 |
| Plasticizer | 3.80 |

A conventional Banbury mixer was set at 10 rpm and the ram was set at 50 psi. The Part A starting materials were mixed for 12 minutes.

The sulfur cure system selected was mixed with the nitrile base rubber polymer with some plasticizer to make a second part of this embodiment. The following Table VI shows the Part B ingredients for this embodiment.

TABLE VI

| Part B Starting Materials - Example 4 | Weight |
|---|---|
| Nitrile Rubber Masterbatch | 68.00 lbs. |
| Plasticizer OLN | 17.00 lbs. |
| ASD-75 (75% Sulfur and 25% Nitrile Rubber, Wyrough & Loser) | 2071 grams |
| AAD-75 (75% MBTS and 25% Nitrile Rubber, Wyrough & Loser) | 895 grams |
| S (PVI) D50 - Retarder | 0.3 lbs. |

Part B was mixed in a conventional Banbury mixer set at 10 rpm and ram set at 50 psi for 12 minutes.

The equal parts of Part A and Part B are mixed to make the rubber composition of this embodiment. Table VII contains typical physical properties of Example 4 cured for 50 minutes at 300° F.

TABLE VII

| Physical Properties of Example 4. | |
|---|---|
| Rheometer ASTM D2084-79 320° F. 6 min. motor, 3° arc. | 100 cpm |
| ML, Minimum torque (pounds force/inch) | 4.75 |
| MH, Maximum torque (pounds force/inch) | 41.0 |
| TS2 minutes to a 2 pound force/inch rise above ML | 1.025 |
| TC (90), minutes to 90% of maximum torque | 3.55 |
| Tensile strength ASTM D412-75 psi | 1740 |
| $M_{100}$ psi | 450 |
| $M_{200}$ psi | 1070 |
| $M_{300}$ psi | 1575 |
| Elongation, ASTM D412-75, Percent | 350 |
| Durometer, Shore A, ASTM D2240-75 | 63 |
| Tear strength, Die C, ASTM D624-73 pounds/inch | 130 |

FIG. 1 is a cross-section of a telescopic joint of a marine riser. The joint is below the platform which is on the ocean's surface. The inner barrel 10 and outer barrel 12 move up and down independently of each other due to constant movement of the ocean environment. The upper packing element 14 and lower packing element 16 are placed in the annulus between the inner barrel 10 and outer barrel 12. An upper piston 18 and lower piston 20 can be hydraulically actuated to position the seals. Upper piston 18 is placed above seal 14 and lower piston 20 is placed beneath seal 16.

As can be seen in FIG. 1, the packing elements 14 and 16 will be subject to wear from contact with the inner and outer barrels as well as contact from the pistons. The new rubber and fluorocarbon micropowder composition has an increased expected life over other rubber compositions previously used.

The packing elements for a marine riser shown in FIG. 1 are manufactured using extruded sections which are in log form. The extruded log is cut to a preselected length and placed in a circular mold for heat curing. FIG. 1 which shows two packing elements for a marine riser is exemplary of rubber parts which can be used in this invention. It is not intended to limit the use of the rubber composition to a particular type of rubber part.

Upper and lower packing elements shown as 14 and 16 in FIG. 1 were made of Examples 2, 3 and 4 and tested for wear resistance in a full size telescopic joint designed for use in 21″ marine drilling risers. The tests were devised to duplicate the conditions on a drilling rig and test the endurance of the packers to ensure that they would meet or exceed the intended service requirements of six months. Three types of test were administered for operating characteristics, reciprocating life tests and reciprocating force tests.

Measurements of the amount of operator pressure to seal the upper and lower packers at varying well bore pressure were taken to define operating characteristics. The full rated well bore pressure is 500 psi. Normal drilling pressure is 25 psi. The test was conducted at static mode with no movement of the inner barrel 10 or outer barrel 12.

The following Table VIII shows the results of the operating characteristics of Examples 2, 3 and 4.

TABLE VIII

| Operating Characteristics | |
|---|---|
| | Operator Pressure |
| Example 2 | |
| Upper packing element Wellbore pressure psi | |
| 25 | 240 psi |
| 50 | 275 psi |
| 100 | 325 psi |
| 300 | 575 psi |
| 500 | 900 psi |
| Lower packing element Wellbore pressure psi | |
| 25 | 200 psi |
| 50 | 200 psi |
| 100 | 300 psi |
| 300 | 375 psi |
| 500 | 600 psi |
| Example 3 | |
| Upper packing element Wellbore pressure psi | |
| 25 | 100 psi |
| 50 | 125 psi |
| 100 | 175 psi |
| 300 | 425 psi |
| 500 | 650 psi |
| Example 4 | |
| Upper packing element Wellbore pressure psi | |
| 25 | 100 psi |
| 50 | 125 psi |
| 100 | 175 psi |
| 300 | 500 psi |
| 500 | 750 psi |
| Lower packing element Wellbore pressure psi | |
| 25 | 100 psi |
| 100 | 125 psi |
| 300 | 350 psi |
| 500 | 550 psi |

The pressures shown in Table VIII are satisfactory for operator pressures to seal the packing elements relative to wellbore pressure.

The reciprocating life tests are used to measure the decay characteristics of the packing elements under the sea states that would be encountered for an offshore rig including the extreme service conditions during which wear occurs more rapidly. The packing elements maintained a seal during varying wellbore pressure and movement to duplicate the typical action of a rig including vessel heave. Example 4 tested to give a life expectancy of more than two years as compared to six months normal service of a packing element. The natural rubber packing element of Example 3 projected life was greater than 1.6 years. The life of the natural rubber packing element of Example 2 is greater than 7 months.

The reciprocating force tests are designed to determine the force of the inner barrel 10 through the packing unit as a function of well bore pressure and the operator pressure. The limiting factor is the compressive load which a joint (not shown in FIG. 1) above the telescopic joint can handle which is 20,000 lbs. The packing elements are pressurized to maintain a seal while the inner barrel is reciprocated. The results of the reciprocating force tests are shown in Table IX.

TABLE IX

Reciprocal Force Tests

| | Reciprocating Resistance lbs. force |
|---|---|
| Example 2 | |
| Upper packing element Wellbore pressure | |
| 25 psi | 6,000 |
| 500 psi | 8,000 |
| Lower packing element Wellbore pressure | |
| 25 psi | 6,000 |
| 500 psi | 7,000 |
| Upper and Lower packing element Wellbore pressure | |
| 25 psi | 10,000 |
| 500 psi | 12,000 |
| Example 3 | |
| Upper packing element Wellbore pressure | |
| 25 psi | 3,000 |
| 500 psi | 9,000 |
| Example 4 | |
| Upper and Lower packing element Wellbore pressure | |
| 25 psi | 9,000 |
| 500 psi | 11,000 |

The results of these tests show that the compositions of this invention have improved wear characteristics which give a longer service life than necessary, and in some cases significantly longer. The tests relating to packing elements exemplify that the wear resistant characteristics can be beneficial in other applications where similar characteristics for rubber parts would be needed.

What is claimed is:

1. A rubber composition comprising a base rubber polymer;
    a friction reducing system consisting of a mixture of polytetrafluoroethylene micropowder of particle size less than one micron and an oil;
    said oil being incompatible with said base rubber polymer;
    said friction reducing system mixed with said base rubber in the amount of 6% to 38% by weight of base rubber; and
    a sulfur cure system compatible with said base rubber.

2. A rubber composition of claim 1 wherein the friction reducing system is comprised of 5% to 35% polytetrafluoroethylene micropowder by weight of the base rubber and 1% to 3% of incompatible oil by weight of the base rubber.

3. A marine riser packing element composed of the rubber composition of claim 1.

4. A rubber composition of claim 1 including a plasticizer compatible with said base rubber.

5. A rubber composition of claim 1 including an inhibitor.

6. A rubber composition comprising
    a base rubber polymer;
    polytetrafluoroethylene micropowder of a particle size less than one micron mixed with said rubber in the amount of 5% to 35% by weight of said rubber;
    an organic oil which is incompatible with said base rubber in the amount of 1% to 3% by weight of said rubber;
    powdered graphite in the amount of 1% to 3% by weight of said rubber; and
    a sulfur cure system compatible with said base rubber.

7. A rubber composition of claim 6 wherein said base rubber is selected from the group consisting of natural rubber and nitrile rubber.

8. A rubber composition of claim 6 including a plasticizer compatible with said base rubber.

9. A rubber composition of claim 6 including an inhibitor.

10. A rubber composition of claim 1 wherein said base rubber polymer is selected from the group consisting of natural rubber and nitrile rubber.

11. A rubber composition of claim 1 including carbon black.

12. A rubber composition of claim 6 including carbon black.

* * * * *